Feb. 13, 1962 L. WEGMANN 3,020,735

AUTOMATICALLY OPERABLE ARTICULATED COUPLING MEANS BETWEEN THE ROLLS OF A ROLLING MILL AND THEIR DRIVE SPINDLE MEANS

Filed Jan. 12, 1960 5 Sheets-Sheet 1

INVENTOR

LUDWIG WEGMANN

BY Leon M. Strauss

AGT.

3
20
24
23
25
Sp
22b
7
22a
19
8
4
21
9
10
6
1c
1a
5
1b
1
W
2
INVENTOR
LUDWIG WEGMANN
BY
AGT.

Feb. 13, 1962 L. WEGMANN 3,020,735

AUTOMATICALLY OPERABLE ARTICULATED COUPLING MEANS BETWEEN THE ROLLS OF A ROLLING MILL AND THEIR DRIVE SPINDLE MEANS

Filed Jan. 12, 1960 5 Sheets-Sheet 3

INVENTOR
LUDWIG WEGMANN

BY Leon M. Strauss
AGT.

INVENTOR
LUDWIG WEGMANN
BY Leon M. Strauss
AGT.

INVENTOR
LUDWIG WEGMANN
BY Leon M. Strauss
AGT.

United States Patent Office 3,020,735
Patented Feb. 13, 1962

1

3,020,735

AUTOMATICALLY OPERABLE ARTICULATED COUPLING MEANS BETWEEN THE ROLLS OF A ROLLING MILL AND THEIR DRIVE SPINDLE MEANS

Ludwig Wegmann, Duisburg, Germany, assignor to Demag Aktiengesellschaft, Duisburg, Germany Filed Jan. 12, 1960, Ser. No. 1,928
Claims priority, application Germany Jan. 16, 1959
12 Claims. (Cl. 64—8)

The present invention relates generally to an automatically engageable and disengageable articulated coupling means, in particular, to an articulated clutch or coupling mechanism which is resiliently displaceable in axial direction and is disposed between each roll of an interchangeable roll stand and its associated drive spindle or spindles.

When inserting new rolls, the prior art practice has been to manually bring the associated clutch parts together into a position suitable for the mutual engagement thereof. However, to avoid major stoppages and resulting production losses, the exchange of the roll stands must be effected in a very short period of time. This requires a rapid engagement and disengagement between the rolls and their driving means.

To solve this problem, the prior art has suggested an automatically articulated coupling to connect a roll journal with a drive spindle. In this coupling, clutch teeth, which are provided on the front faces of the coupling parts, mesh with one another over a centering pin. The pin is guided in a sleeve provided on the roll side resiliently displaceable in axial direction and fixed against rotation in an articulation piece. However, according to this arrangement, the articulation piece, with the clutch sleeve and the resilient members causing the axial displacement of the latter, is permanently connected with the roll journal. Since every exchangeable roll must be equipped with these parts, there results high initial costs and expensive stock-keeping.

Therefore, it is an object of the present invention to provide means to obviate the foregoing disadvantages. Pursuant thereto provision is made in an articulated clutch of the described type for the clutch part on the spindle side to comprise the articulation piece and the structural elements to effect its axial displacement.

One clutch part may then comprise one end of the roll journal, constructed as a forwardly tapering insertable cupola provided with areas for transmission of the torque, while the articulation piece of the other clutch part comprises a sleeve with a recess complementary to the insertable cupola.

Pursuant to another embodiment of the invention, the non-tapering part of the insertable coupling end or stud may be of a cylindrical cross-section with two parallel and oppositely disposed flattened portions. It is also possible to provide a cylindrical recess in the sleeve having two fixed segments whose faces limit the recess and extend parallel to each other.

It is then possible to insert the segments, provided with dovetailed guides, into the recesses. To secure the segments against axial displacement, an end ring is provided at the free end of the clutch sleeve. The segments are provided at their ends opposite the insertable end with a recess of conical or similar formation extending and vanishing toward the interior of the sleeve.

The end of the spindle, formed as a spindle leaf, is provided with an additional extension which engages in a complementary recess in the articulation piece, so as to limit the extent of rotational displacement of the articulation piece from a horizontal position.

It is another object of the present invention to provide means conducive to a very efficacious construction characterized by a short roll journal end on the clutch side and a clutch or coupling of reduced length.

2

Pursuant to this object, the articulation piece is provided with a centering bolt on the side opposite the roll journal and the roll journal has a funnel-shaped forwardly widening bore to receive this bolt, while the opposite end faces of the roll journal and of the articulation piece are provided with clutch teeth for the purpose of torque transmission.

It is a further object of the present invention to provide means resulting in a considerable reduction in cost and simplification of stock-keeping. Pursuant thereto the exchangeable rolls are provided with a journal on the clutch side, so that only one clutch sleeve is required for the top and bottom roll of each roll stand, rather than for each roll. Moreover, with the large number of rolls required in a rolling mill, the present invention obviates the necessity to remove the articulated clutch part from each roll taken out or to provide it on each new roll. In addition, when remaining in their place, these clutch parts suffer less than if they must be transported back and forth in the plant together with the rolls.

It is a still further object of the present invention to provide means for assuring increased production despite simplification and reduction of costs. Pursuant thereto and despite the heavy parts, the roll exchange itself can be carried out conveniently and quickly, the guide bolts and the parts transmitting the torque engaging automatically, by rotational displacement of the drive spindles.

These and other objects of the invention will become further apparent from the detailed description, reference being made to the accompanying drawings, showing preferred embodiments of the invention.

In the drawings which illustrate the best modes presently contemplated for carrying out the invention:

FIG. 5 is another embodiment showing in vertical section an articulated clutch having segments dovetailed into the clutch sleeve;

FIG. 6 is a top plan view, partially in horizontal section, of a clutch pursuant to FIG. 5; and FIG. 7 is a section along line A—A of FIG. 5.

Figure 1:
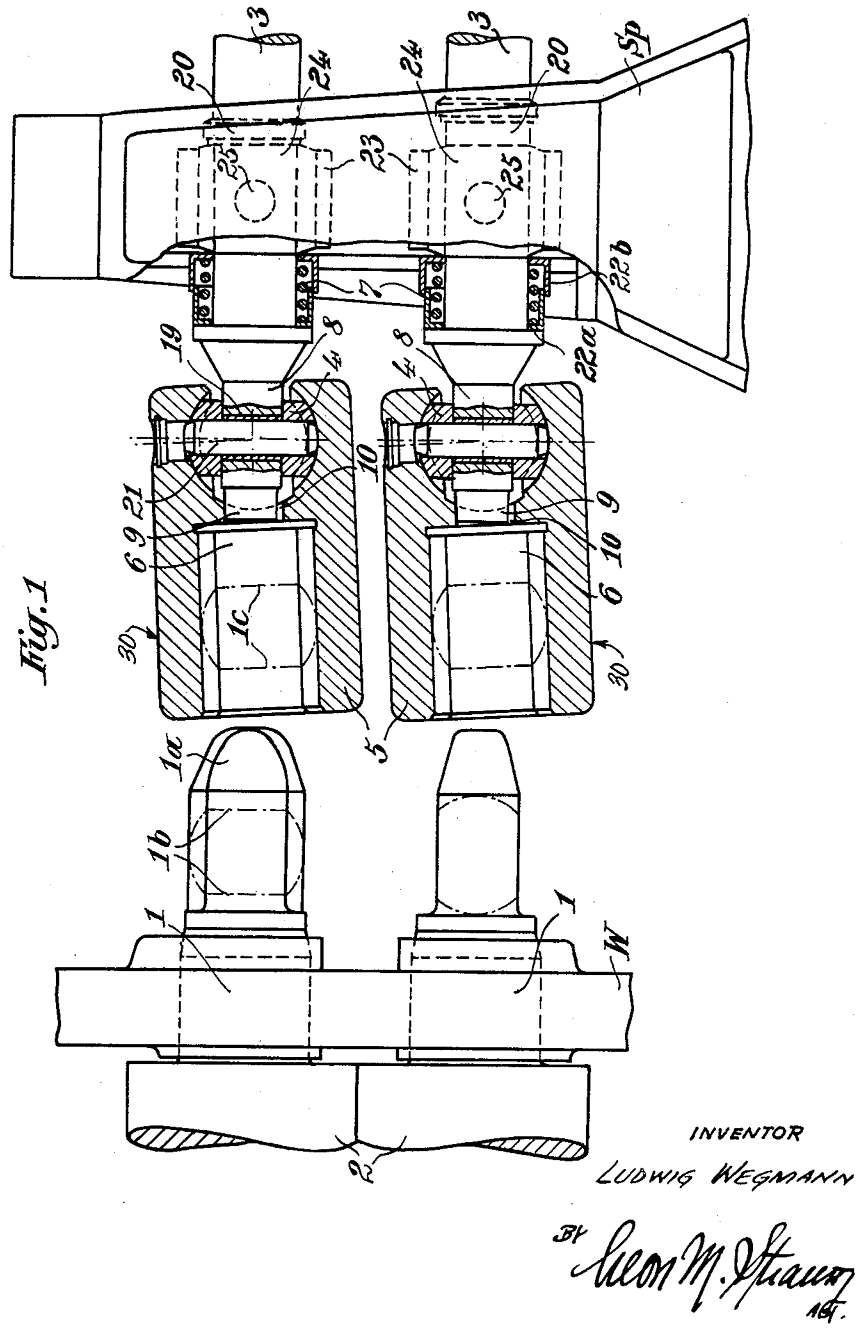
FIG. 1 shows, in section, an articulated clutch in disengaged condition disposed between the spindle end and the roll end, centering and torque transmission being effected through an insertable cupola provided at the end of the roll journal, the cupola being insertable into a clutch sleeve connected with the drive spindle.
Figure 2:
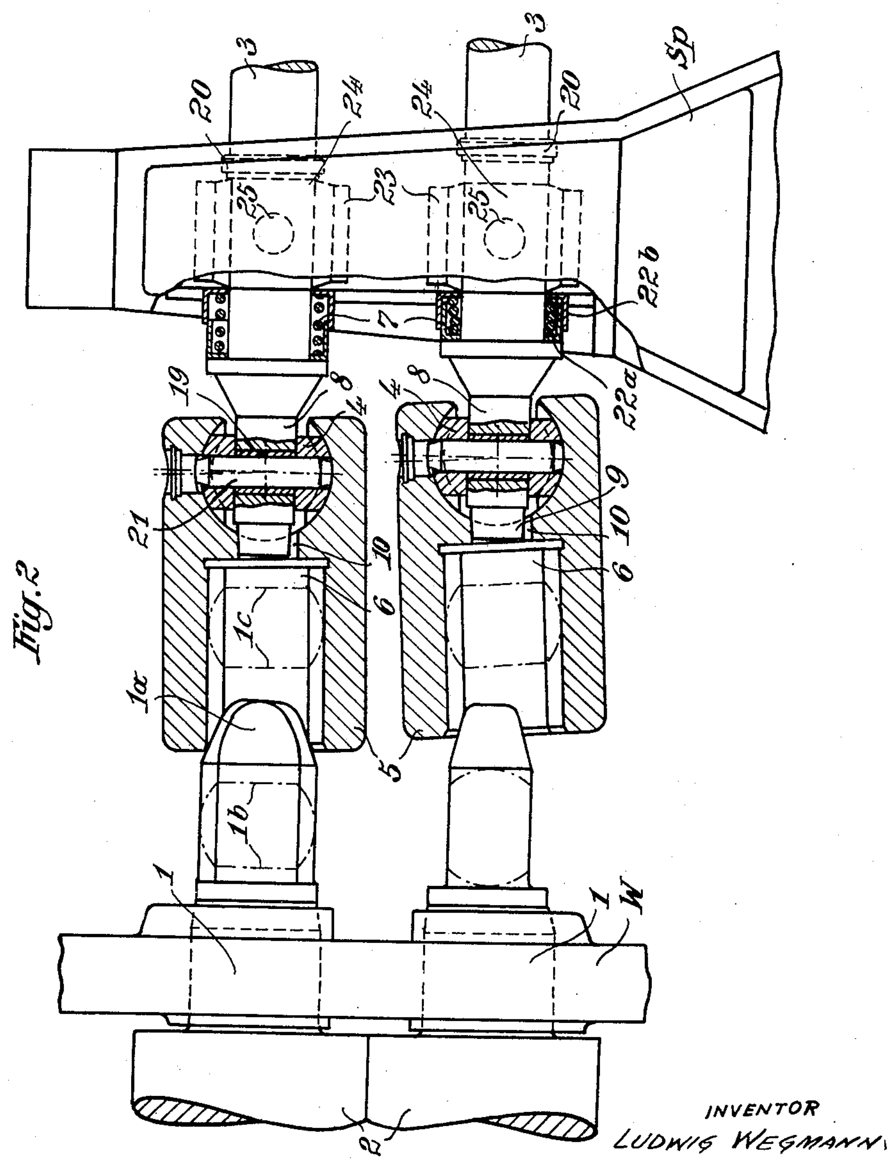
FIG. 2 shows the same arrangement as FIG. 1 immediately before engaging the clutch.
Figure 3:
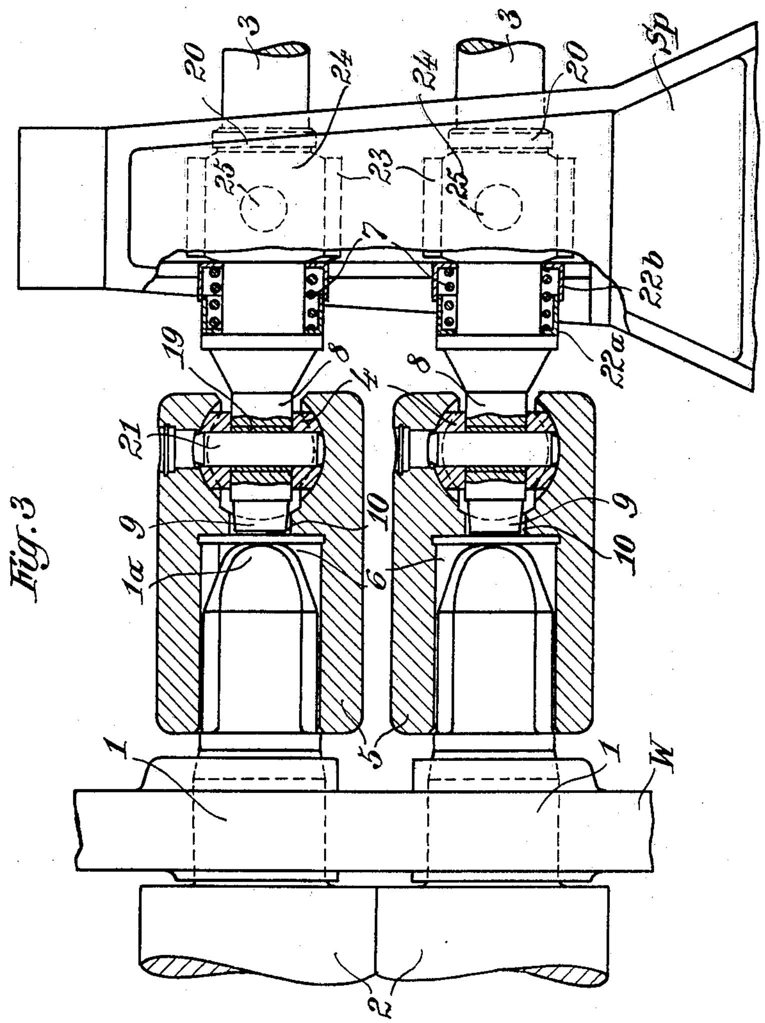
FIG. 3 shows the clutch in engaged position.

Referring now to FIGS. 1–3 in detail, there is shown a roll journal 1 for each roll 2. Each journal is mounted in the roll stand W and has at its clutch side end a forwardly tapering insertable rounded coupling end or finger 1*a* which, as is indicated by the cross-section shown in dash-dot lines, is provided with areas 1*b* for transmission of the torque. The drive spindles 3 are mounted in the spindle bed *Sp* and engage for fixed rotation into the articulated coupling part 30 by means of their ends which form the spindle leaves 8. This engagement is effected over a universal or cross joint consisting of blocks 4, pins 21 and a bushing 19.

The part of the articulation piece 30 opposite the roll journal is formed as coupling sleeve 5, which is provided with a recess 6 complementary to the insertable coupling end 1*a* and has two parallel detent or limit faces 1*c*. The articulation piece is axially displaceable together with the drive spindle by means of a spring 7, disposed in a two-part telescopic housing 22*a*, 22*b*. In order to effect unilateral limitation of the axial displacement of the spindles which rotate in the spindle bed in bearings 23, over blocks 24 by means of trunnions or journals 25, stop or abutment rings 20 are provided on the rotatable spindles.

The upper insertable coupling part shown in FIGS. 1 to 3, is in the correct position for entering the associated recess provided in the opposite sleeve upon engagement of the coupling. However, the lower coupling part, which is rotatably displaced by 90° relative to the upper insertable coupling part, pushes the sleeve to the right during the engaging step with consequent compression of spring 7, in order to engage in the position shown in FIG. 3, only after continued rotation of the lower drive spindle.

The extent of the rotational displacement of the coupling sleeve from the horizontal position is limited by a conical projection 9 which tapers forwardly from the spindle part 8 and engages in a complementary recess or bore 10 defined in the articulation piece 5. The fixing of the insertable end piece in the coupling sleeve effects a play-free connection which does not require any special precision machining, such as force-fitting or oil-hydraulic shrinkage.

Figure 4:
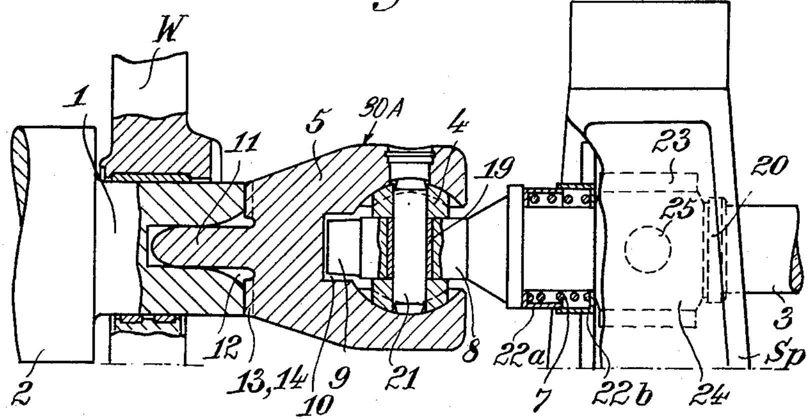
FIG. 4 illustrates another embodiment showing in section a roll, a journal provided with a centered recess into which a centering pin engages, while the torque transmission is effected over a clutch gearing arranged on the end faces of the two clutch parts.

In the embodiment illustrated in FIG. 4, the articulation piece 30A is provided at its coupling-side end with a centering pin 11 disposed in a recess 12 defined in the roll journal or trunnion 1. The front end of the trunnion has a funnel-shaped formation, while the opposing end faces 13, 14 of the two coupling sides are provided with clutch teeth for transmission of the torque.

Figures 5, 6, 7:
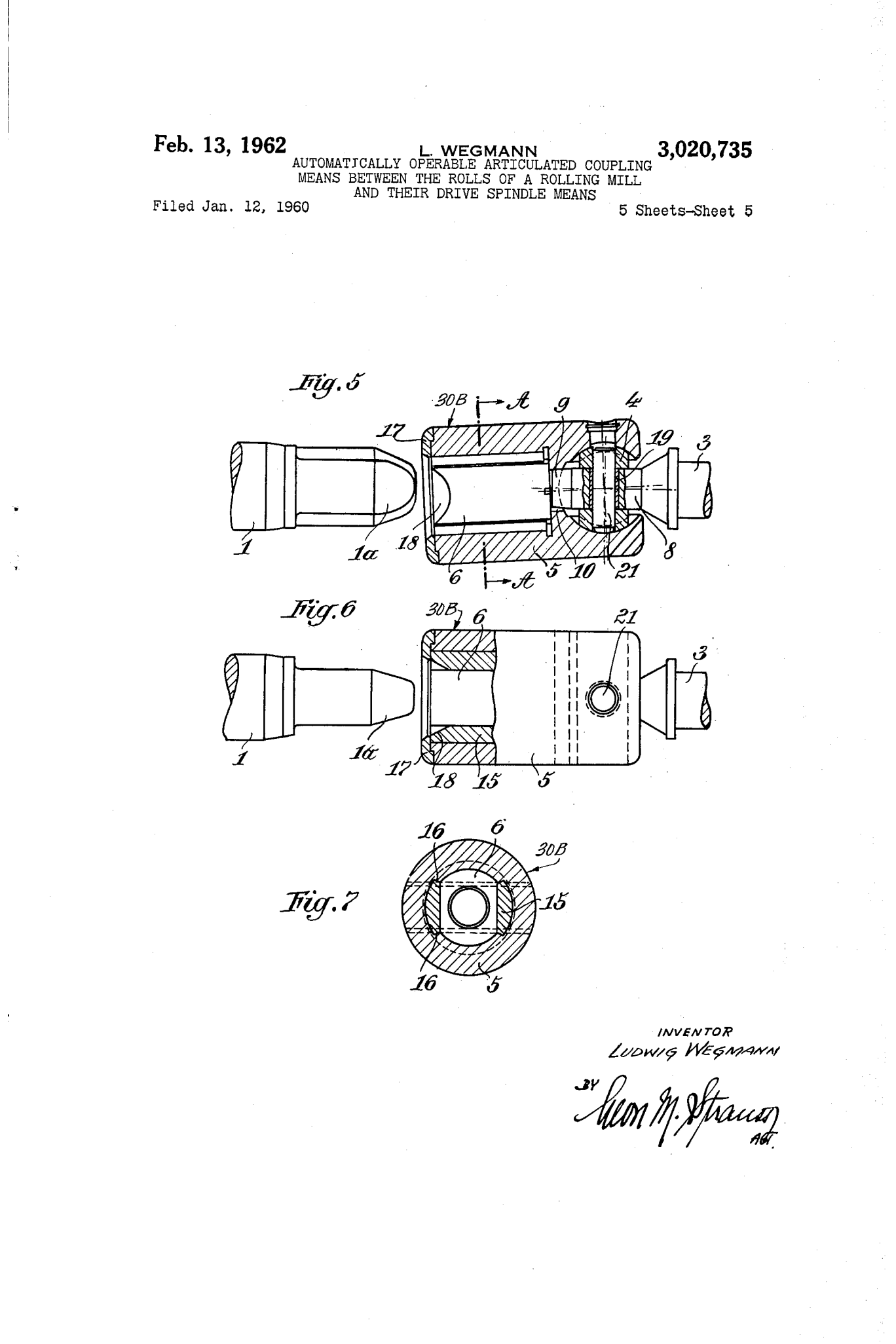

In the embodiment illustrated in FIGS. 5 to 7, the articulation piece 30B is provided with segments 15 which have dovetail-shaped guides 16 provided in cylindrical recess 6 of the sleeve 5, which are inserted in additional lateral recesses conformed to said guides.

The segments are fixed against axial displacement by an end ring 17 fastened to the free end of the sleeve 5 and are provided at their ends opposite the insertable coupling end 1*a* with a cone-like recess 18 extending and vanishing toward the interior of said sleeve, whereby a greater guarantee is given that upon introduction of the coupling stud or end 1*a* into the coupling sleeve 5, jamming is avoided.

It can thus be seen, that there has been provided according to the invention a coupling arrangement comprising a roll stand, a plurality of rolls journalled in said stand, a spindle bed provided with a drive spindle for each of said rolls, and automatically engageable and disengageable coupling means having two parts, respectively, disposed between each roll and its associated drive spindle, one part of each coupling means being located at the spindle-side portion thereof and being provided with an articulation piece, and means to effect resilient axial displacement of the latter relative to said rolls.

Various changes and modifications may be made without departing from the spirit and scope of the present invention and it is intended that these modifications and changes be embraced by the annexed claims.

Having thus described the invention, what is claimed as new and desired to be secured by Letters Patent is:

1. A coupling connecting a driving and a driven member for rotation together, comprising a sleeve mounted on one of said driving and driven members for pivotal movement about at least one axis other than the member rotational axis and being secured to said member for rotation therewith, said sleeve and the associated member being jointly displaceable in an axial direction, and means to bias said members with said sleeve in a direction toward the other of said members, the other of said driving and driven members being insertable into said sleeve, said insertable member and said sleeve having complementary substantially straight faces which are engageable for rotating said driving and driven members together.

2. A coupling according to claim 1, wherein said sleeve and the member insertable in said sleeve include substantially straight side faces which are in complementary engagement.

3. A coupling according to claim 1, wherein the member insertable in said sleeve is tapered toward its end to permit easy centering and insertion into said sleeve.

4. A coupling according to claim 1, wherein said sleeve is mounted on its associated member by means of a universal joint.

5. A coupling according to claim 1, wherein said member carrying said sleeve includes an annular collar, a sleeve housing supported against said collar around said member, a second sleeve of larger diameter telescopic over said sleeve housing and having an end portion adapted to bear against a portion of said member, said biasing means including a spring confined within said sleeve housing and said second sleeve member.

6. A coupling according to claim 1, wherein said member having said sleeve includes a transverse pin extending outwardly from each side thereof, said sleeve having a cylindrical recessed portion in which said pin is rotatable within confined limits, sliding block means surrounding said pin and bearing against the walls of the cylindrical recessed portion of said sleeve to permit pivotal movement thereof.

7. A coupling according to claim 6, wherein an end portion of said member extends into said sleeve recessed portion and the outer surface thereof is engageable with the walls of said sleeve to limit pivotal movement thereof.

8. A coupling according to claim 1, wherein said driving member carries said sleeve, said driven member and said sleeve including complementary parallel flat parts.

9. A coupling according to claim 1, wherein said sleeve includes side cutout portions defined in the interior thereof, a segment in each of said cutout portions having opposed faces which are substantially parallel.

10. A coupling according to claim 9, wherein said cutouots and said segments are of dovetail interlocking construction.

11. A coupling according to claim 9, including a closure ring secured to the ends of said sleeve and securing said segments in said sleeve.

12. A coupling according to claim 1, wherein said sleeve has an inwardly beveled interior surface for centering the other of said member when it is coupled thereto.

References Cited in the file of this patent

UNITED STATES PATENTS

| | | |
|---|---|---|
| 2,577,508 | Biggert | Dec. 4, 1951 |
| 2,893,222 | Albedyhl et al. | July 7, 1959 |
| 2,911,804 | O'Brien | Nov. 10, 1959 |